(12) United States Patent
Kim et al.

(10) Patent No.: US 7,421,338 B2
(45) Date of Patent: Sep. 2, 2008

(54) ROBOT SYSTEM

(75) Inventors: Yong-jae Kim, Seoul (KR); Ki-cheol Park, Kyungki-do (KR); Won-jun Koh, Kyungki-do (KR); Yeon-taek Oh, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 738 days.

(21) Appl. No.: 10/809,351

(22) Filed: Mar. 26, 2004

(65) Prior Publication Data

US 2005/0033474 A1    Feb. 10, 2005

(30) Foreign Application Priority Data

Aug. 4, 2003   (KR)   ................... 10-2003-0053667

(51) Int. Cl.
*G01C 21/00*   (2006.01)
*G05B 15/00*   (2006.01)

(52) U.S. Cl. ............... 701/207; 700/258; 356/3.05; 356/5.11; 340/988

(58) Field of Classification Search ......... 701/207, 701/300, 301; 356/3; 340/988; 901/1; 700/60, 700/251

See application file for complete search history.

(56) References Cited

U.S. PATENT DOCUMENTS

| | | | | |
|---|---|---|---|---|
| 3,613,095 | A | * | 10/1971 | Elwood ................... 342/458 |
| 3,687,556 | A | | 8/1972 | Price et al. |
| 4,007,991 | A | | 2/1977 | Robertsson |
| 4,268,167 | A | * | 5/1981 | Alderman ................ 356/3.09 |
| 4,309,758 | A | | 1/1982 | Halsall et al. |
| 4,328,545 | A | * | 5/1982 | Halsall et al. ............. 701/23 |
| 4,700,301 | A | * | 10/1987 | Dyke ...................... 701/25 |
| 4,815,840 | A | | 3/1989 | Benayad-Cherif et al. |

(Continued)

FOREIGN PATENT DOCUMENTS

DE   31 07 674   9/1982

(Continued)

OTHER PUBLICATIONS

J. Borenstein, H.R. Everett, L. Feng, "Where am I? Sensors and Methods for Mobile Robot Positioning", 1996 by University of Michigan, Chapter 6.*

(Continued)

*Primary Examiner*—Thomas G. Black
*Assistant Examiner*—Lin B Olsen
(74) *Attorney, Agent, or Firm*—Staas & Halsey LLP

(57) ABSTRACT

A robot system including a beacon provided with a transmitting part to transmit a light for location determination, and a mobile robot provided with a receiving part to receive the light. The robot system further includes a rotation driving part to rotate the transmitting part about a predetermined axis; an encoder to add phase information regarding how much the transmitting part is rotated by the rotation driving part with respect to a reference direction to the light; and a location determiner to determine a location of the mobile robot based on the phase information of the light received by the receiving part. Accordingly, a robot system is provided, which can precisely determine a location of a mobile robot regardless of external environmental conditions, distance, and reduction of cost by using a few transmitters.

22 Claims, 17 Drawing Sheets

U.S. PATENT DOCUMENTS

| | | | |
|---|---|---|---|
| 4,817,000 A | | 3/1989 | Eberhardt |
| 5,000,564 A | * | 3/1991 | Ake .................... 356/3.16 |
| 5,165,064 A | | 11/1992 | Mattaboni |
| 5,243,397 A | * | 9/1993 | Friedland ............... 356/3.09 |
| 5,363,305 A | | 11/1994 | Cox et al. |
| 5,682,313 A | | 10/1997 | Edlund et al. |
| 5,715,042 A | * | 2/1998 | Milani et al. ............ 356/3.12 |
| 5,974,348 A | | 10/1999 | Rocks |
| 6,437,860 B1 | | 8/2002 | Jäppinen |
| 7,110,092 B2 | * | 9/2006 | Kasper et al. ............ 356/4.01 |

FOREIGN PATENT DOCUMENTS

| | | |
|---|---|---|
| EP | 522200 A2 * | 1/1993 |
| FR | 2640760 | 6/1990 |
| JP | 10-293037 | 11/1998 |
| JP | 2000-230971 | 8/2000 |
| KR | 88-3711 | 5/1988 |
| KR | 10-2003-0026496 | 4/2003 |
| WO | WO 94/28436 | 12/1994 |

OTHER PUBLICATIONS

European search report for application 04250985, 1-2206, Nov. 8, 2004, 5 pp.

* cited by examiner

ROBOT SYSTEM

CROSS-REFERENCE TO RELATED APPLICATIONS

This application claims the benefit of Korean Patent Application No. 2003-53667, filed Aug. 4, 2003, in the Korean Intellectual Property Office, the disclosure of which is incorporated herein by reference.

BACKGROUND OF THE INVENTION

1. Field of the Invention

The present invention relates to a robot system, more particularly, to a robot system to identify a location of a mobile robot by receiving light including phase information from beacons.

2. Description of the Related Art

As robots are getting more widely used in various fields of industries, various robots that perform different functions are being developed, for example, a robot to manage household duties, etc. In the past, robots were confined to a space, and performed an assigned task. However, today, robots can automatically move and operate beyond a predetermined orbit.

In order to move a mobile robot to a target location, various techniques have been proposed, such as, detecting a guide line or providing a device on a moving path, etc.

FIG. 1 schematically illustrates a conventional robot system in which a mobile robot determines the robot's location through the use of beacons.

As shown in FIG. 1, the conventional robot system comprises beacons 100, and a mobile robot 110.

The beacon 100 includes a plurality of transmitters 101 placed at predetermined positions emitting light such as an infrared ray, an electromagnetic wave, or the like, which travels in a straight line.

Because the light emitted from the transmitters 101 travels in a straight line, the light reaches the mobile robot 110 when the mobile robot 110 is located within a predetermined area aligned with the transmitters 101. Further, each transmitter 101 emits light different from the light emitted by the other transmitters in inherent information.

The mobile robot 110 includes a plurality of receivers 111, and a controller (not shown).

The receiver 111 receives the light emitted from the transmitter 101 of the beacon 100, and outputs information based on intensity of the received light to the controller.

The controller determines the position of the beacon 100 based on intensity information outputted by the receiver 111, and determines a location of the mobile robot 110 relative to the position of the beacon 100.

A method of identifying the location of the mobile robot 110 according to the conventional robot system will be further described in the following paragraphs.

While moving, the mobile robot 110 continuously receives the light emitted from the transmitter 101 of the beacon 100 through the plurality of receivers 111. Accordingly, the farther the light emitted from the transmitter 101 travels in a straight line, the more the light becomes diffused. Therefore, the light received by the receiver 111 has maximum intensity when the receiver 111 and the transmitter 101 are aligned.

The receiver 111 outputs information based on the intensity of the received light to the controller, and the controller determines the relative position of the beacon 100 based on the intensity information outputted by the receiver 111.

Light received by the receivers 111 does not have an interference because the light travels in a straight line, and includes the inherent information of the respective transmitter 101 provided to the beacon 100, thus, allowing the controller to calculate the location of the mobile robot 110 relative to the position of the beacon 100.

However, the conventional robot system, using the beacon 100, makes use of an analog signal that is highly affected by properties of the transmitter and the receiver, making it difficult to precisely determine the intensity of the light. Further, a wave traveling in space has decreased energy inversely proportional to the cubed distance of the wave from the transmitter; therefore, the movable area of the mobile robot 110 is limited to the surrounding area of the beacon 100.

Further, a conventional robot system has been provided according to which the location of a mobile robot is determined by an image processing operation using a camera, etc. However, this operation has a relatively high cost, and is sensitive to illumination.

SUMMARY OF THE INVENTION

Accordingly, it is an aspect of the present invention to provide a robot system, which can precisely determine a location of a mobile robot regardless of external environmental conditions, and that reduces cost of the robot system by using fewer transmitters.

The foregoing and/or other aspects of the present invention are achieved by providing a robot system comprising: a beacon provided with a transmitting part to transmit light to determine a location, and a mobile robot provided with a receiving part to receive the light. The robot system further comprises a rotation driving part to rotate the transmitting part about a predetermined axis; an encoder to add phase information regarding rotation of the transmitting part by the rotation driving part with respect to a reference direction to the light; and a location determiner to determine a location of the mobile robot based on the phase information of the light received by the receiving part.

Additional aspects and advantages of the invention will be set forth in part in the description which follows and, in part, will be obvious from the description, or may be learned by practice of the invention.

According to another aspect of the invention, the transmitting part includes at least one transmitter, and the transmitter is rotated by the rotation driving part about the predetermined axis.

According to yet another aspect of the invention, the transmitting part includes a mirror supported by the beacon disposed at an incline with respect to a horizontal direction, and a transmitter to emit the light at a predetermined incident angle, where the rotation driving part rotates the mirror about the axis, and the encoder adds the phase information regarding rotation of the mirror by the rotation driving part with respect to a reference direction to the light.

According to an aspect of the invention, the transmitting part includes two transmitters to emit light towards double sides of the mirror.

According to another aspect of the invention, the receiving part includes a receiver to receive the light transmitted from the transmitting part.

According to a further aspect of the invention, the receiving part includes a conical mirror reflecting light from various directions towards one direction, and a receiver to receive the light reflected from the conical mirror.

According to an additional aspect of the invention, the beacon has inherent beacon information, and the encoder adds the beacon information and the phase information to the light.

According to an aspect of the invention, the location determiner determines the location of the mobile robot based on the displacement of the mobile robot, and the phase information received by the receiving part.

BRIEF DESCRIPTION OF THE DRAWINGS

These and/or other aspects and advantages of the invention will become apparent, and more readily appreciated from the following description of the embodiments, taken in conjunction with the accompany drawings of which.

DETAILED DESCRIPTION OF THE PREFERRED EMBODIMENTS

Figure 1:
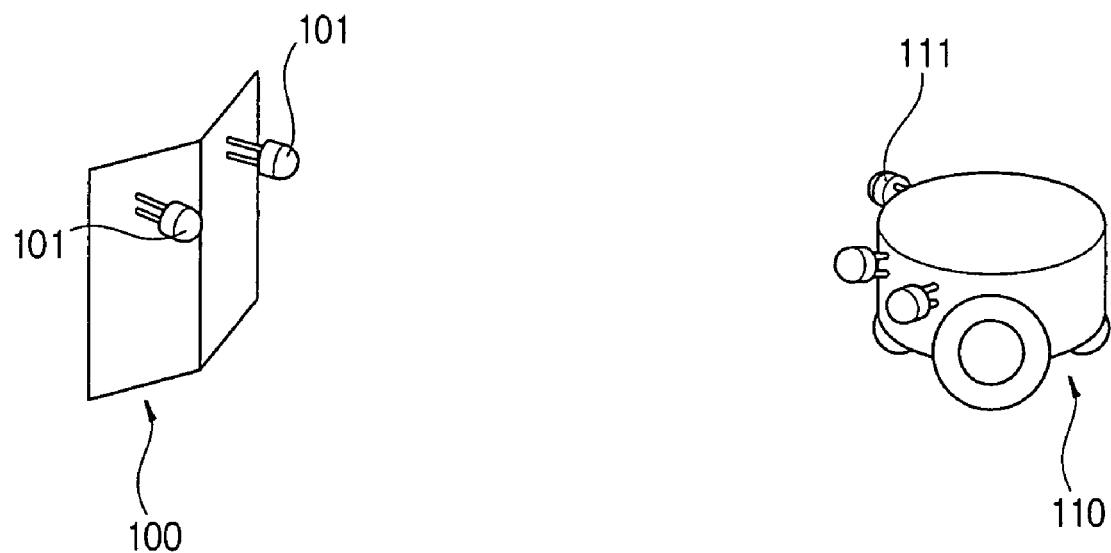
FIG. 1 schematically illustrates a conventional robot system according to which the location of a mobile robot is determined through the use of a beacon.

Reference will now be made in detail to the embodiments of the present invention, examples of which are illustrated in the accompanying drawings, wherein like reference numerals refer to the like elements throughout.

Figure 2:
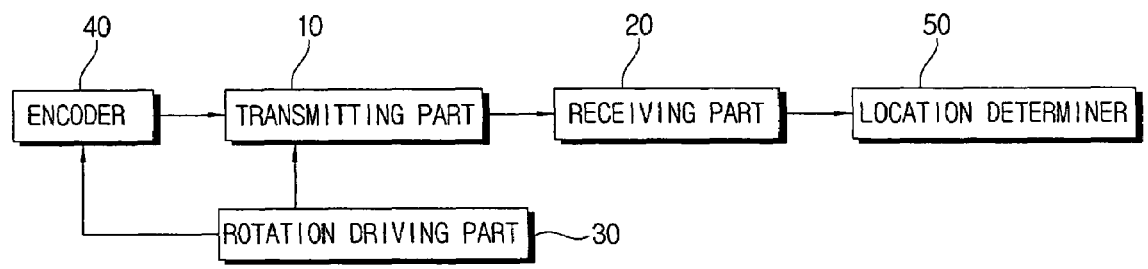
FIG. 2 is a block diagram of a robot system according to an aspect of the present invention.

FIG. 2 is a block diagram of a robot system according to an aspect of the present invention. As shown in FIG. 2, a robot system comprises a transmitting part 10, a receiving part 20, a rotation driving part 30, an encoder 40, and a location determiner 50.

The transmitting part 10 is provided to a beacon, and comprises at least one transmitter to emit light used to determine a location of a mobile robot. Here, an infrared ray, an electromagnetic wave, or the like, which travels in a straight line, can be employed as the light emitted via the transmitter. Further, the light may include various information by phase-shift keying, frequency-shift keying, etc.

The receiving part 20 comprises at least one receiver to receive the light emitted from the transmitting part 10. The receiver has directivity to receive the light emitted from the transmitter traveling in a straight line, thus, the other receivers cannot receive light with the same phase information.

The rotation driving part 30 comprises a motor and a shaft, and rotates the transmitting part 10 about a predetermined axis as the origin. If the transmitting part 10 comprises a plurality of transmitters, the origin is centrally disposed among the transmitters. Further, to detect all prospective locations of the mobile robot at directive angles of the transmitters, the rotation driving part 30 rotates the transmitters within a predetermined angle. The rotation driving part 30 has a reference direction, and outputs information on a phase shift of the transmitting part 10 relative to the reference direction in accordance with the rotation of the rotation driving part 30 to the encoder 40.

The encoder 40 encodes or modulates to add the phase information output from the rotation driving part 30 to the light. Here, the encoding or the modulating is performed by FSK (Frequency Shift Keying), PSK (Phase Shift Keying), PWM (Pulse With Modulation), etc. according to characteristics of the light. In a case where a plurality of beacons are provided, inherent beacon information is needed to distinguish among the beacons, so that the encoder 40 encodes or modulates the beacon information with the phase information to the light.

The location determiner 50 selects the phase information included in the light that is received by the receiver 20, and calculates the location of the mobile robot relative to the beacon based on the phase information. At least three phase information is needed to determine the location of the mobile robot. Therefore, at least three receivers are needed to receive the three phase information, to be used in determining the relative location of the mobile robot at a predetermined time. If the receivers are less than three or the phase information received by the receivers is less than three, the location of the mobile robot relative to the beacon can be calculated based on the displacement of the mobile robot and the phase information in a different angle of view.

The transmitters of the transmitting part 10 are rotated by the rotation driving part 30 at a predetermined angular frequency. The rotation driving part 30 outputs the phase information of the transmitter rotated relative to the reference direction to the encoder 40, and then the encoder 40 adds the phase information to the light emitted from the transmitters. The light emitted from the transmitter is received by the receiving part 20 of the mobile robot. The received light is outputted to the location determiner 50 after being decoded. Then, the location determiner 50 determines the relative location between the mobile robot and the beacon 1 based on the phase information.

The transmitting part 10 can be variously implemented according to the shapes and the number of transmitters, and the rotation driving part 30 can also be differently operated in accordance with the transmitters.

Figure 3A:
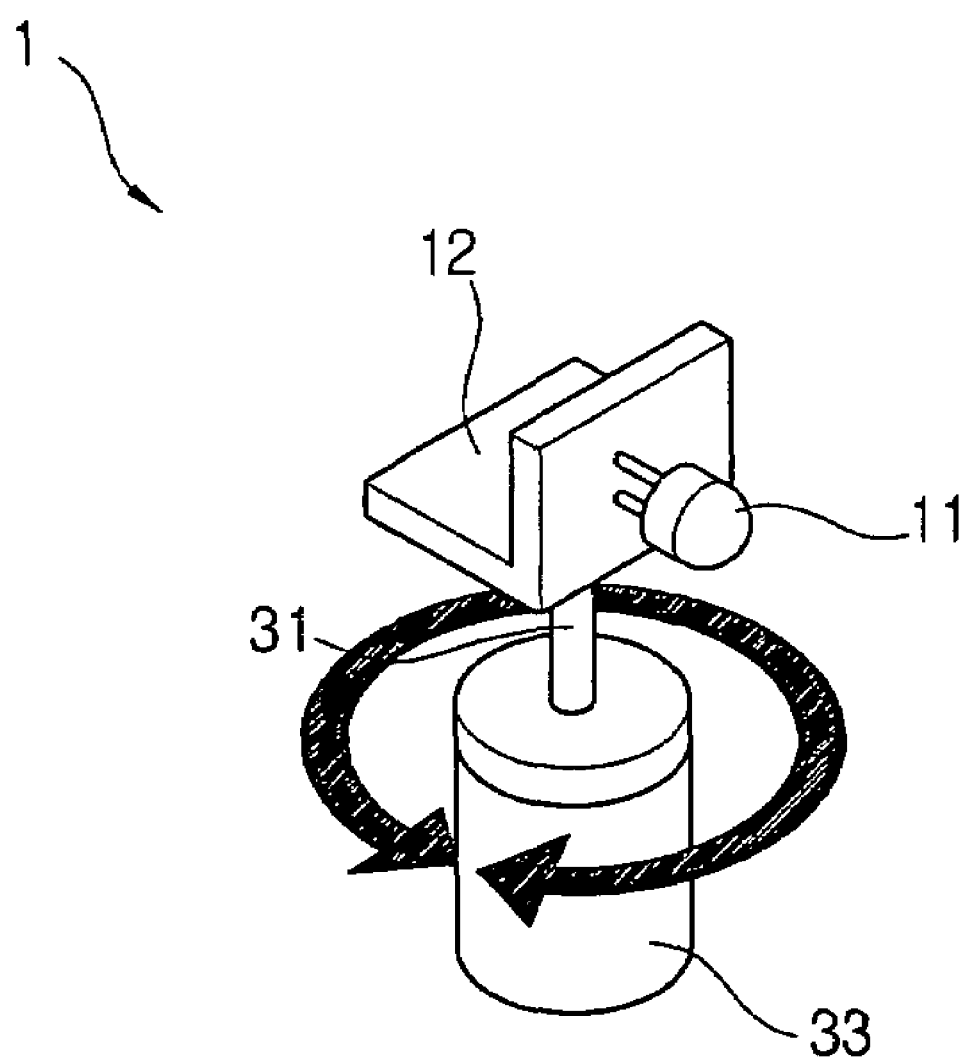
FIGS. 3A, 4A and 5A are perspective views of a transmitter mounted to the beacon according to an aspect of the present invention.
Figure 4A:
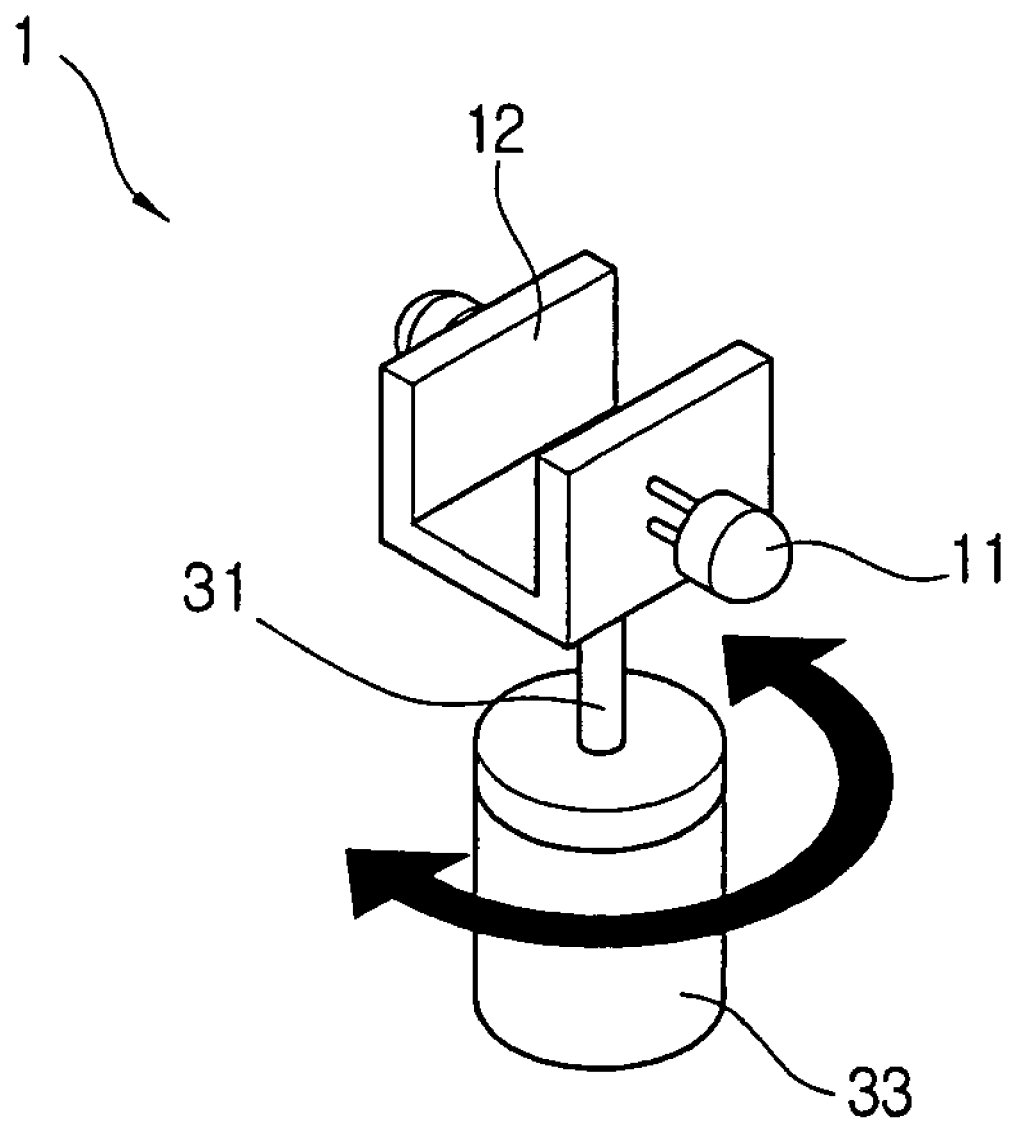
Figure 5A:
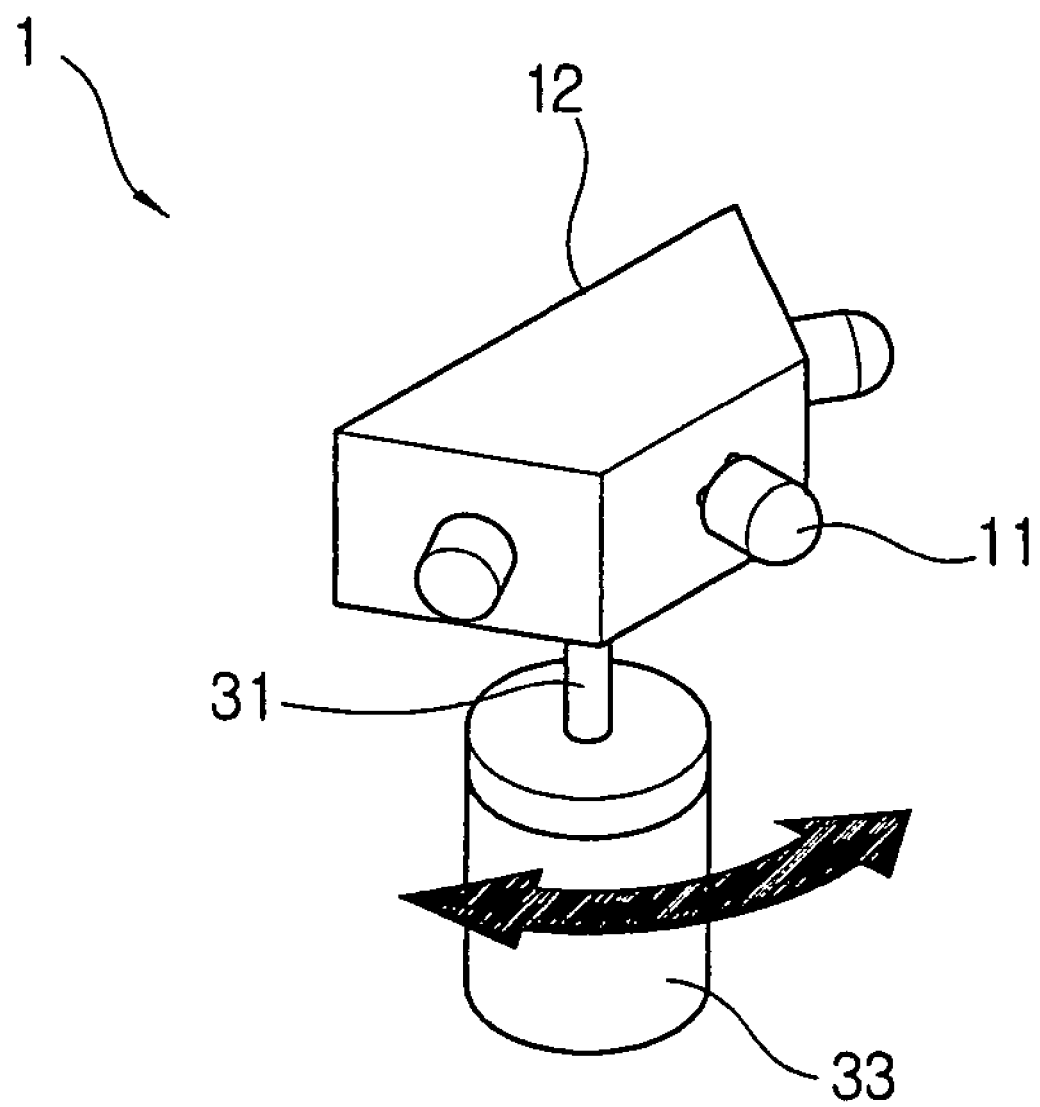

FIGS. 3A, 4A and 5A are perspective views of a transmitter mounted to the beacon according to various aspects of the present invention.

As shown in FIGS. 3A, 4A and 5A, the beacon 1 comprises: e a transmitter 11, a shaft 31, and a motor 33. The transmitter 11 is mounted to a supporter 12, and the shaft 31 connects the supporter 12 to the motor 33 to transmit the rotation from the motor 33 to the supporter 12 and the transmitter 11.

As shown in FIG. 3A, the motor 33 can rotate at an angle within 360 degrees, thereby, allowing the transmitter 11 of the beacon 1 to transmit light in directions within 360 degrees. Accordingly, information of phase angles resulting from rotation of the motor 33 over a period of time is outputted to the encoder 40 through the transmitter 11.

As shown in FIG. 4A, the motor 33 can alternately rotate at an angle within 180 degrees, thereby, allowing two transmitters 11 of the beacon 1 to transmit light in a direction within 360 degrees.

As shown in FIG. 5A, three transmitters 11 are mounted on the supporter 12 spaced from each other at an angle of 60 degrees. Accordingly, the motor 33 can alternately rotate at an angle within 60 degrees, thereby, allowing three transmitters 11 of the beacon 1 to transmit light in a direction within 180 degrees concurrently. If there is no need to allow the light to be outputted from the beacon 1 in all directions of 360 degrees, that is, if there is a dead angle due to the position of the beacon 1, or a moving radius of the mobile robot is limited, or there is no need to transmit the light in all directions, a user can optionally set up the mounting angles of the transmitters 11 and the allowable rotation angle of the motor 33.

Figure 3B:
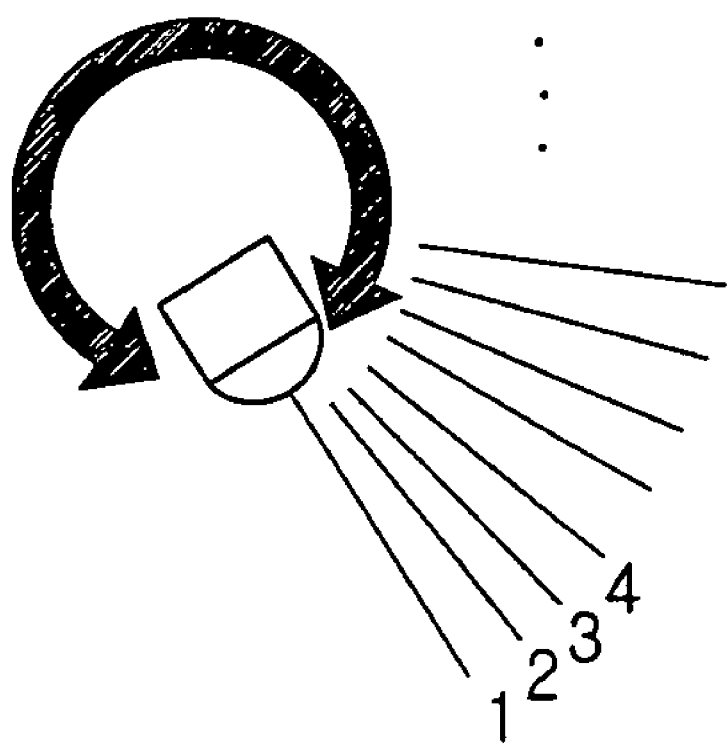
FIGS. 3B, 4B and 5B illustrate that the transmitter rotates at phase angles within an allowable rotation angle in when the transmitter is mounted to the beacon according to an aspect of the invention.
Figure 4B:
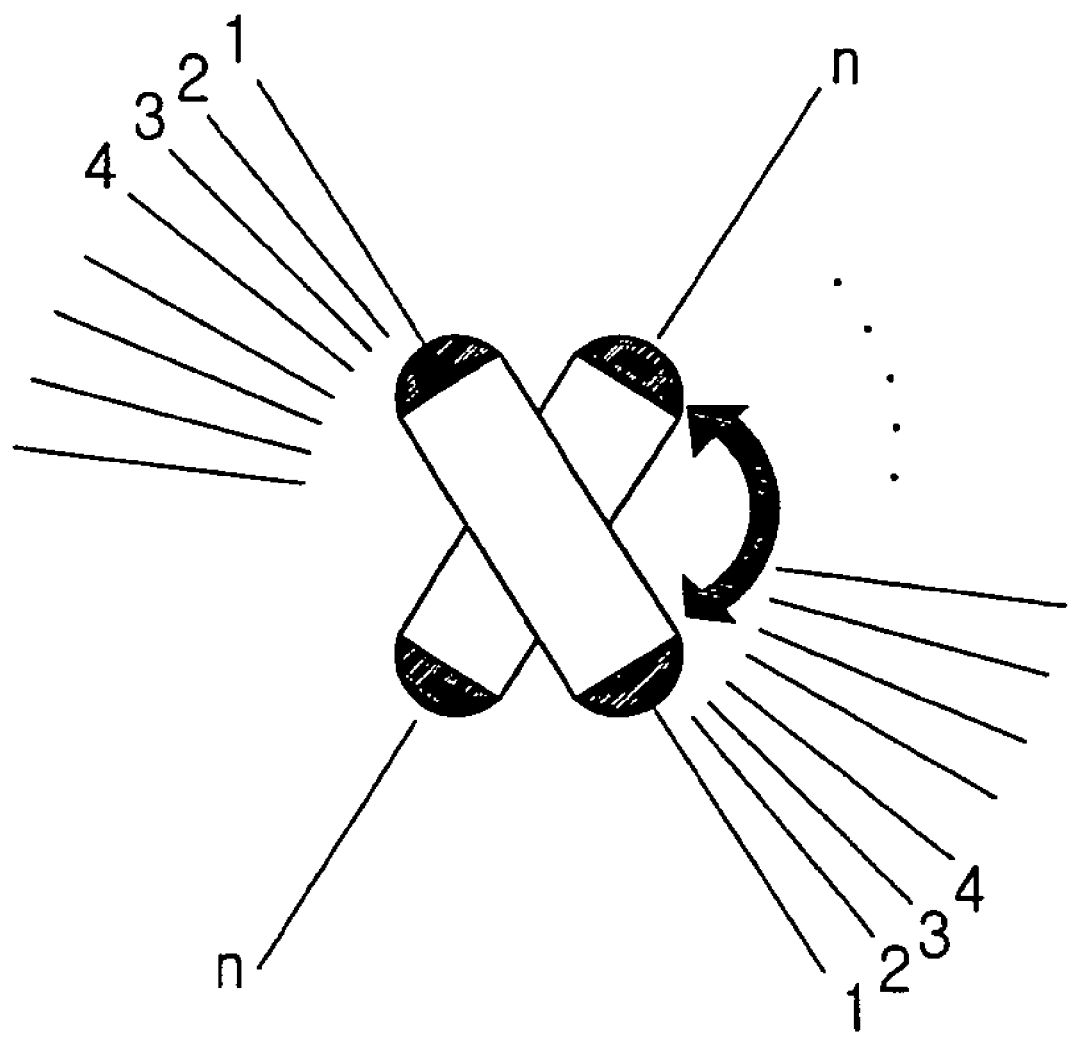
Figure 5B:
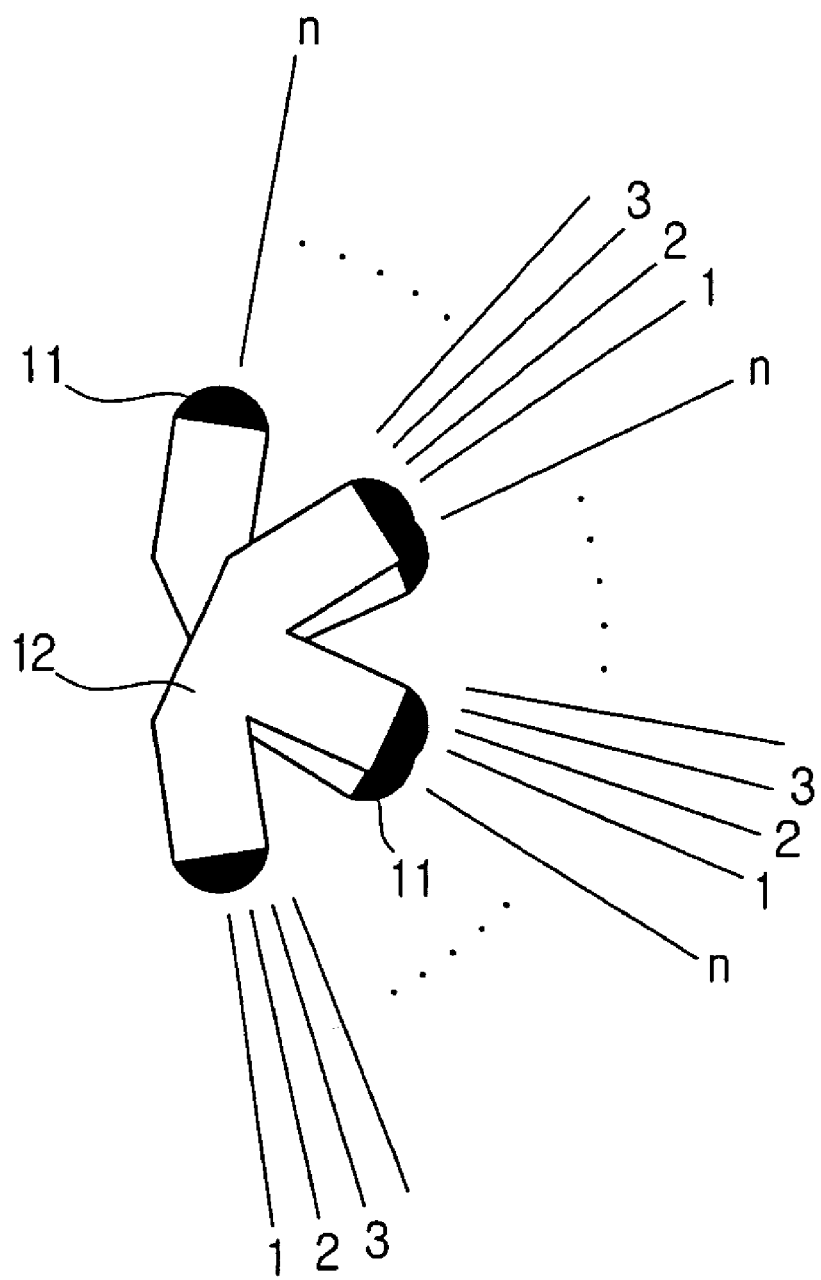

As shown in FIGS. 3B, 4B and 5B, each transmitter 11 rotates at the phase angles within the allowable rotation angle depicted in FIGS. 3A, 4A and 5A, respectively.

When the motor 33 rotates, the transmitter 11 is rotated with a predetermined angular frequency, and changes to the phase angles occurs with respect to the reference direction over a period of time. Therefore, while rotating, the transmitter 11 outputs the light including the phase information corresponding to the rotation direction.

FIG. 5, suppose that the phase information is added to the light whenever the phase angle is changed by 1 degree, the respective transmitters 11 transmit the triple lights sixty times.

In comparison to the two transmitters 11 in FIG. 4A, the light transmitted from the three transmitters 11 in FIG. 5 reaches a predetermined position in a space with more frequency. Therefore, as the number of the transmitters 11 is increased, a resolving power is enhanced to determine the location of the mobile robot, however, cost also increases.

Figure 6A:
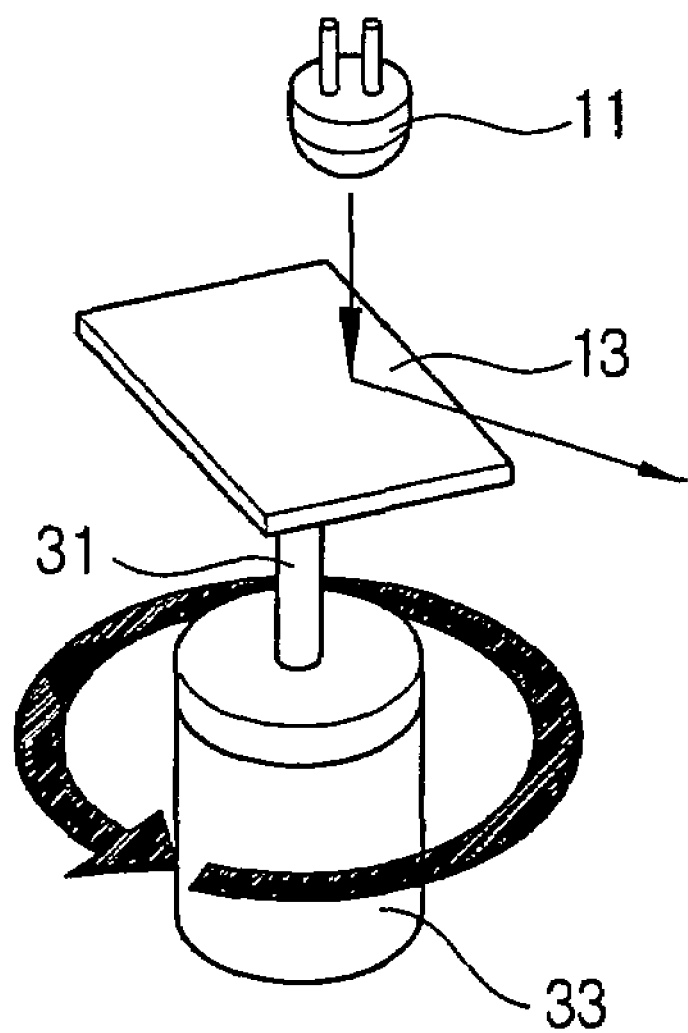
FIG. 6A is a perspective view of the beacon that uses a single sided mirror according to an aspect of the present invention.

FIG. 6A is a perspective view of a beacon using a single sided mirror according to an aspect of the present invention.

The beacon 1 comprises a single sided mirror 13, a transmitter 11, a shaft 31, and a motor 33. The single sided mirror 13 is connected to the shaft 31, and reflects an incident light from the transmitter 11 at a predetermined angle.

The transmitter 11 is disposed facing an upper or bottom surface of the single sided mirror 13, and transmits the light to a reflecting surface of the single sided mirror 13 to determine the location of the mobile robot.

The shaft 31 is connected to the single sided mirror 13, and transmits the rotation from the motor 33 to the single sided mirror 13, so that the motor 33 can rotate the single sided mirror 13 is rotated via the motor 33 with a predetermined angular velocity. Accordingly, if the motor 33 rotates at an angle within 360 degrees, the light can be transmitted to all directions.

That is, the light can be transmitted in all directions, when the light is reflected from the single sided mirror 13 that is rotated by the motor 33 at an angle within 360 degrees. Therefore, there is no need to alternately rotate the motor 33, therefore, the motor 33 can rotate more rapidly. However, if one transmitter 11 is connected to the shaft 31 and the motor 33 rotates at an angle within 360 degrees, it becomes difficult to rotate at an angle within 360 degrees because a cable or the like connected to the transmitter 11 gets twisted.

Figure 7A:
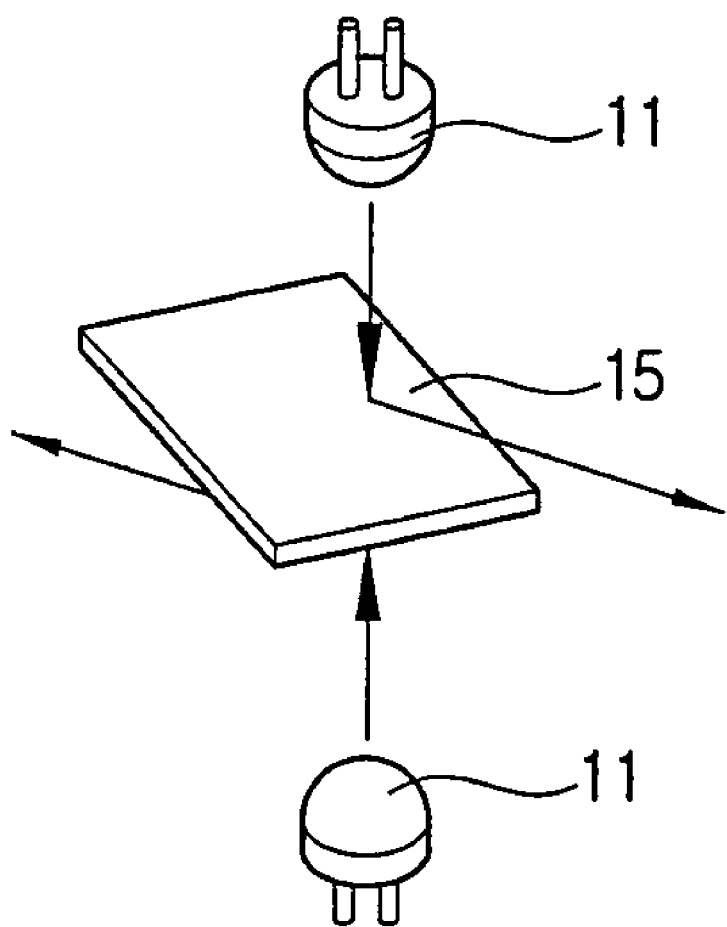
FIG. 7A is a perspective view of the beacon that uses a double sided mirror according to an aspect of the present invention.

FIG. 7A is a perspective view of the beacon using a double sided mirror according to an another aspect of the present invention.

The beacon 1 comprises: a double sided mirror 15, transmitters 11, the shaft (not shown), and the motor (not shown).

The transmitters 11 are provided in upper and lower parts of the beacon 1, and emit the light towards the double sides of the double sided mirror 15 at a respective predetermined angle. The double sided mirror 15 is disposed at an incline with respect to a horizontal direction, and horizontally reflects the incident light from the transmitter 11.

The shaft is connected to the double sided mirror 15, and transmits the rotation from the motor to the double sided mirror 15, so that the double sided mirror 15 is rotated via the motor 33 at a predetermined angular velocity. Accordingly, if the motor 33 rotates at an angle within 180 degrees, the light can be transmitted to all directions.

Figure 6B:
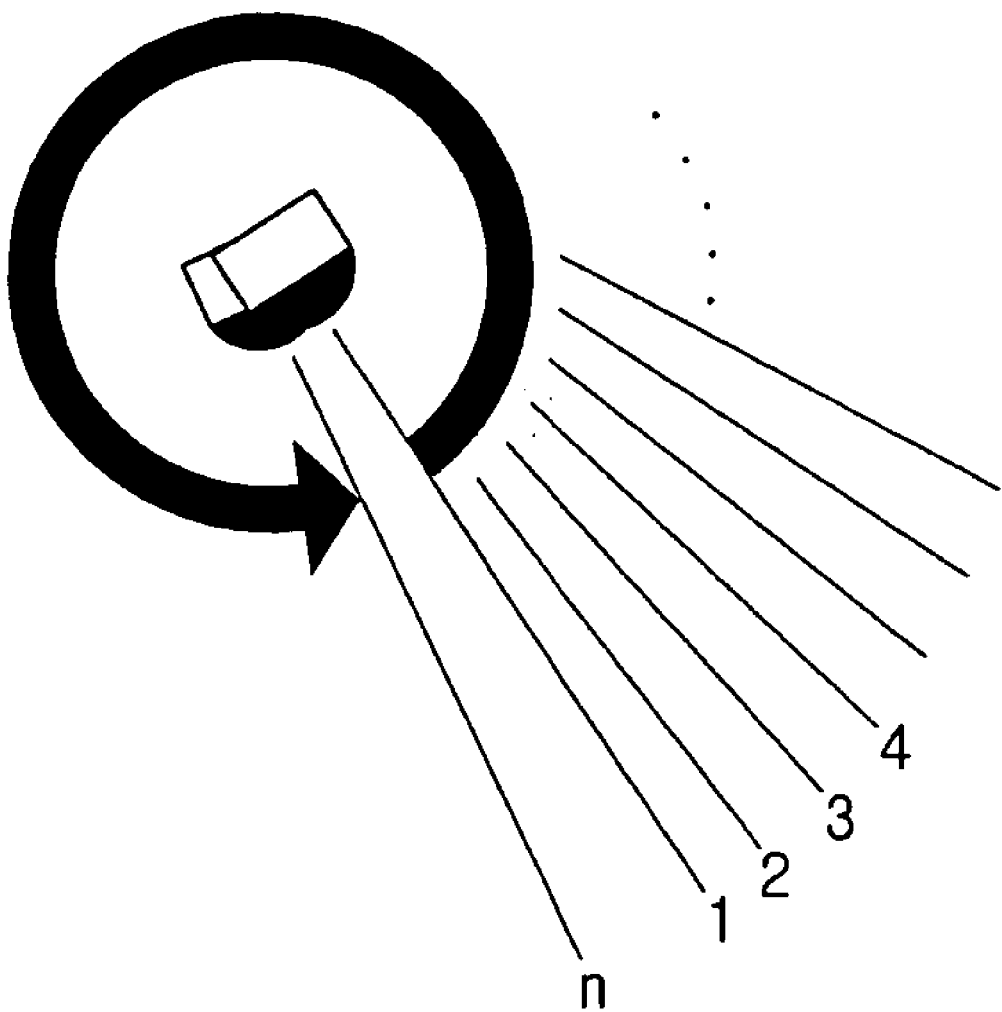
FIG. 6B illustrates the single-sided mirror rotating at phase angles within an allowable rotation angle when the mirror is mounted to the beacon of FIG. 6A.
Figure 7B:
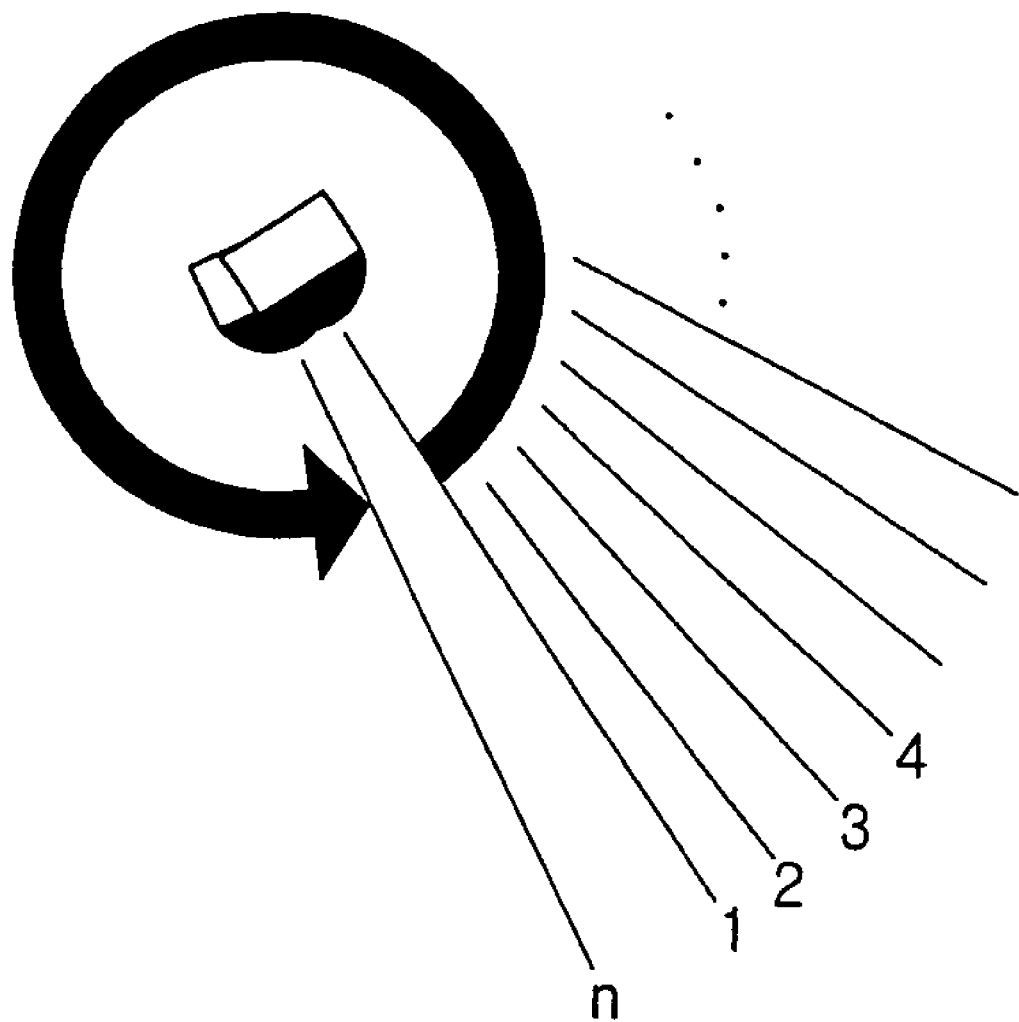
FIG. 7B illustrates the double-sided mirror rotating at phase angles within an allowable rotation angle when the mirror is mounted to the beacon of FIG. 7A.

As shown in FIGS. 6B and 7B, each mirror 13, 15 rotates at the phase angles within the allowable rotation angle depicted in FIGS. 6A and 7A, respectively.

Figure 8:
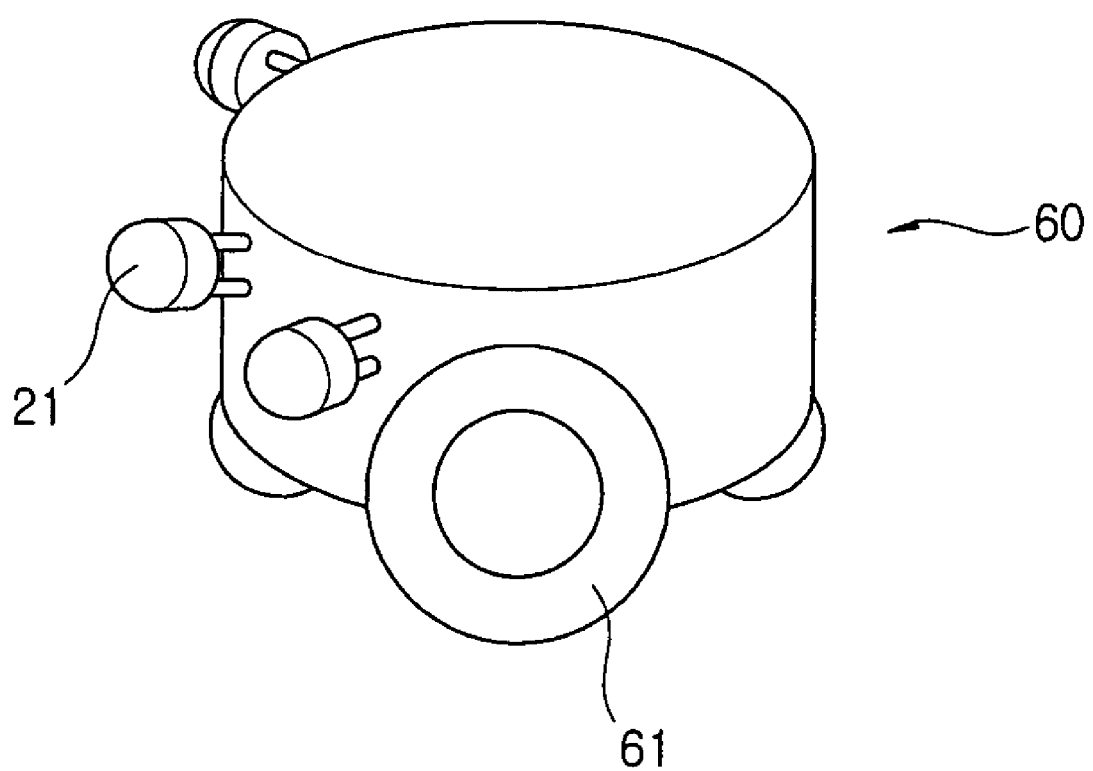
FIG. 8 is a perspective view of a mobile robot having a receiving part according to an aspect of the present invention.

FIG. 8 is a perspective view of a mobile robot having a receiving part according to another aspect of the present invention.

As shown in FIG. 8, the mobile robot 60 comprises wheels 61 used to move the mobile robot, and the receiver 21.

The receiver 21 has directivity to receive the light emitted from the transmitter 11 of the beacon 1 traveling in a straight line, so that the different receivers 21 cannot receive the lights with the same phase information. Therefore, as the number of the receivers 21 of the mobile robot 60 is increased, the more the resolving power is enhanced in determining the location of the mobile robot 60 because the receivers 21 receive the concurrently emitted light from the beacons 1 provided in various directions.

Figure 9A:
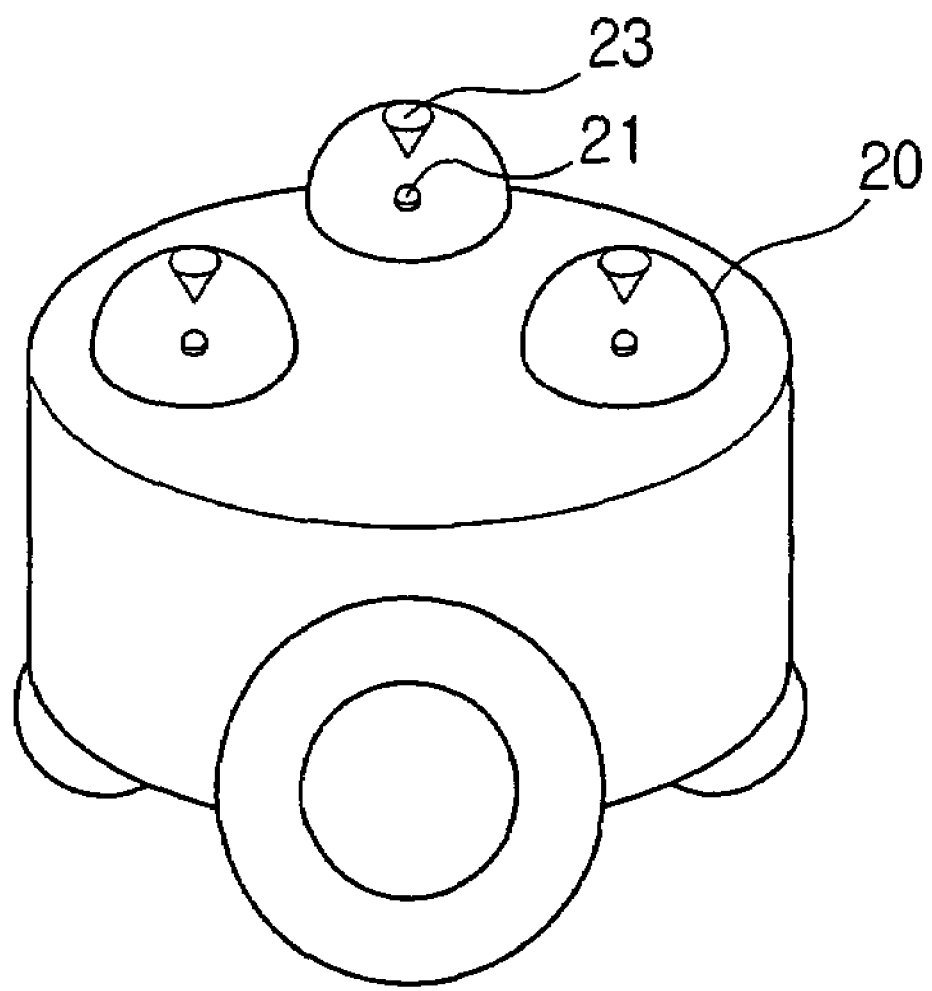
FIG. 9A is a perspective view of the mobile robot comprising a receiver including a conical mirror according to an aspect of the present invention.
Figure 9B:
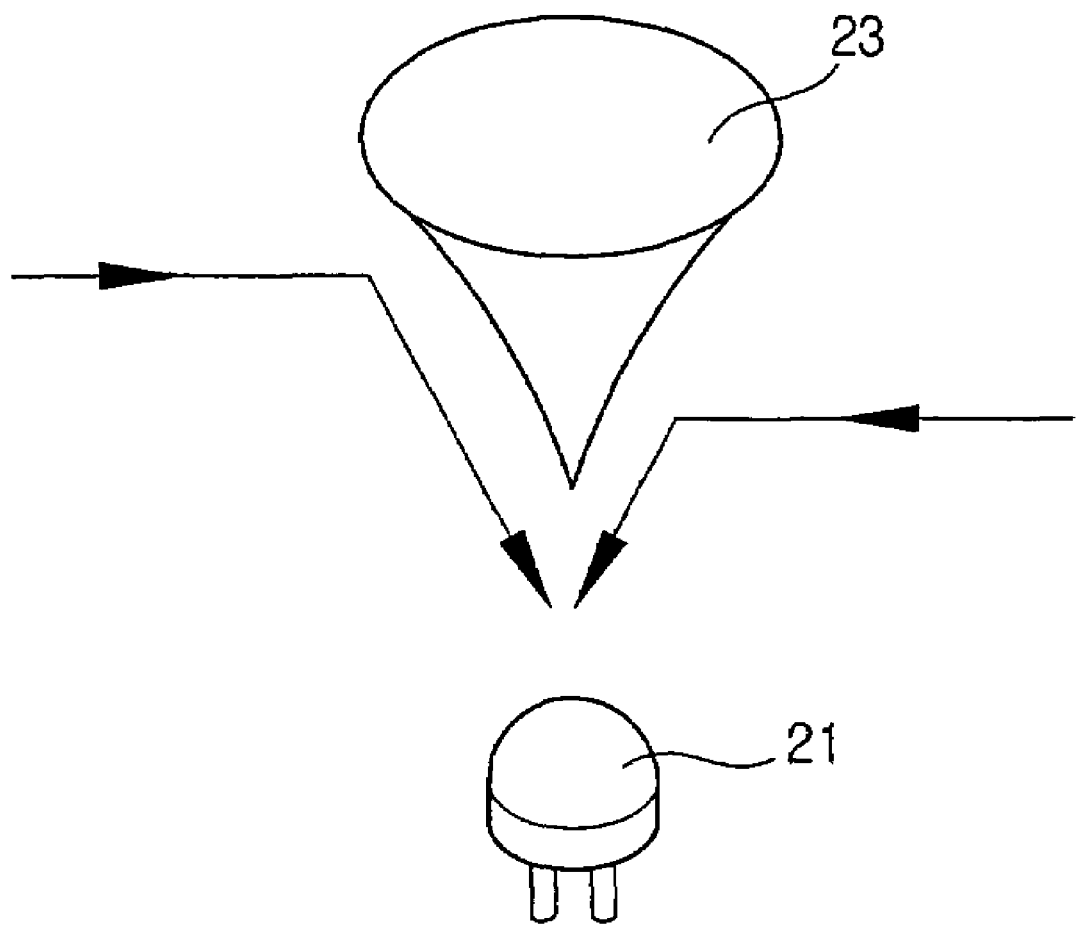
FIGS. 9B is an enlarged perspective view of the receiver having the conical mirror mounted to the mobile robot.

FIG. 9A is a perspective view of a mobile robot comprising a receiver 21 having a conical mirror 23 according to an aspect of the present invention, and FIG. 9B is an enlarged perspective view of the receiver 21 having the conical mirror 23 mounted to the mobile robot.

A conical mirror 23 concentrates the lights horizontally transmitted from the outside into a tip thereof, and then transmits the concentrated light to the location determiner 50 through a receiver 21. The conical mirror 23 should have enough curvature to concentrate the incident light horizontally transmitted in different heights to one point, that is, the tip.

Thus, the problem of receiver 20 due to the directivity of the receiver 21 is solved as the receiver 20 can receive the phase information by receiving the light regardless of the location of the mobile robot 60.

Figure 10:
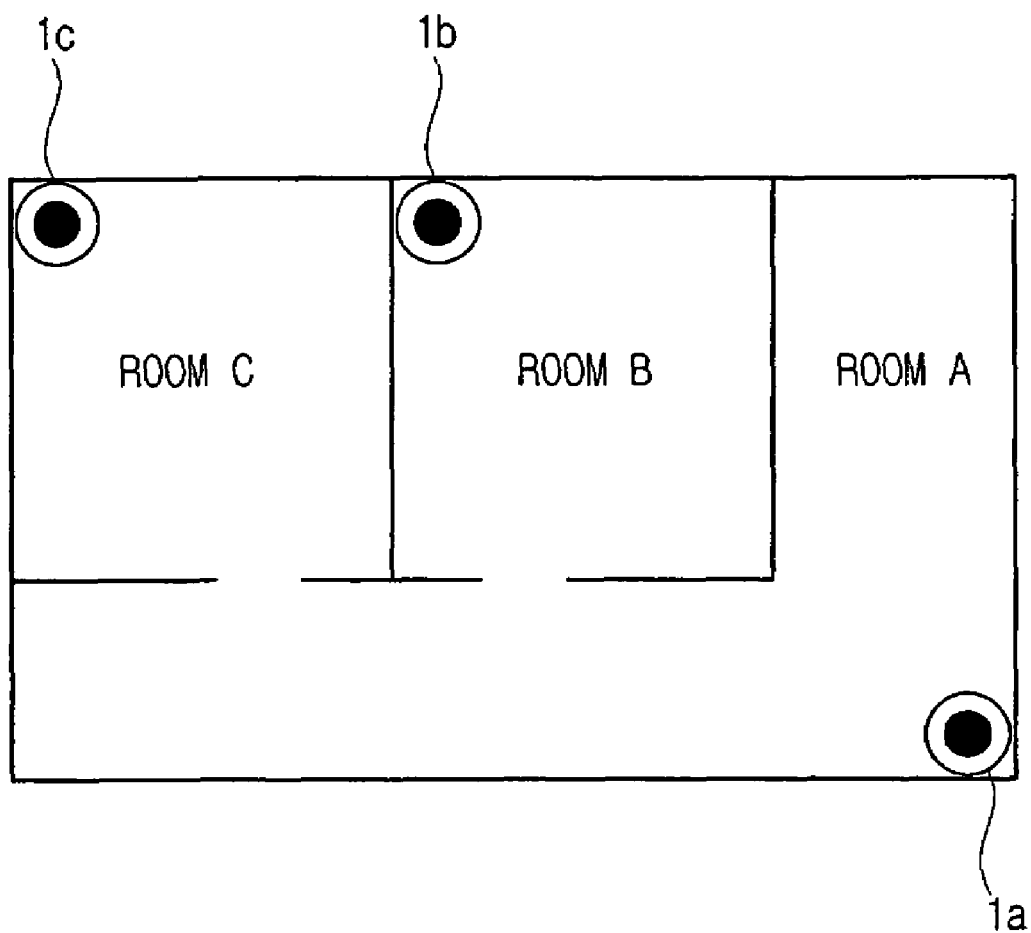
FIG. 10 illustrates a plurality of beacons in a situation where a moving path of the mobile robot includes a dead angle according to an aspect of the present invention.

FIG. 10 illustrates a plurality of beacons where a moving path of the mobile robot includes a dead angle according to another aspect of the present invention.

As shown in FIG. 10, in situations where a movable space of the mobile robot 60 is divided into several parts, light is not always readily transmitted from the beacon 1 to the mobile robot 60.

Accordingly, in order to determine the location of the mobile robot 60 regardless of the location of the mobile robot 60, a plurality of beacons 1a, 1b and 1c are needed. I Accordingly, a first, second, and third beacon, 1a, 1b and 1c, are employed to emit light in rooms "A", "B" and "C", respectively.

Each beacon, 1a, 1b, or 1c has inherent beacon information different from the rest. Further, the encoder 40 (not shown)

provided in each beacon 1a, 1b or 1c adds the beacon information to the light. Further, allowable location of the mobile robot 60 relative to each beacon 1a, 1b and 1c is limited, so that the motor 33 of the rotation driving part 30 for each beacon 1a, 1b or 1c preferably rotates within a limited angle.

Depending on the location, the mobile robot 60 not only determines the phase information but also what beacon (1a, 1b, or 1c) transmits it, thereby, determining its location relative to beacons 1a, 1b or 1c that transmit the phase information.

Figure 11:
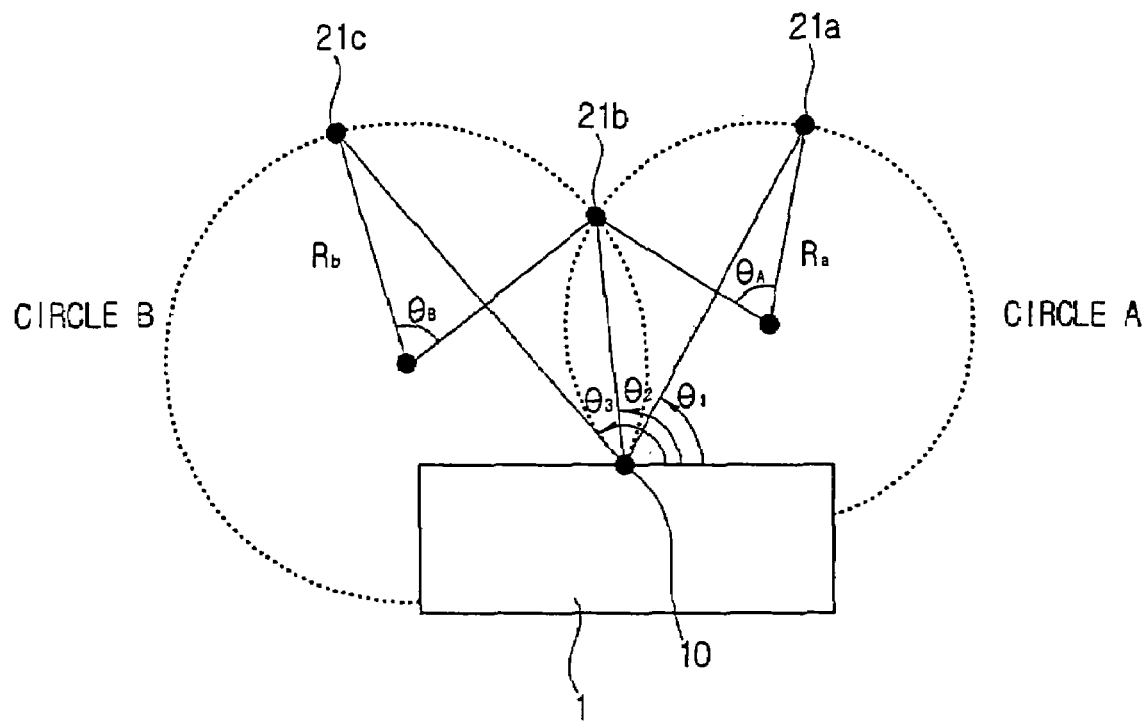
FIG. 11 schematically illustrates an operation to calculate the location of the mobile robot relative to the beacon based on the phase information according to an aspect of the present invention.

FIG. 11 schematically illustrates an operation to calculate the location of the mobile robot relative to the beacon based on the phase information according to an aspect of the present invention.

For example, if a mobile robot 60 with three receiving parts 21 stops moving, three receiving parts 21a, 21b, and 21c, as shown in FIG. 11, receive the light from a transmitter 10 of the beacon 1, leaving a time lag.

Let a circle connecting a first receiver 21a, a second receiver 21b, and the transmitting part 10 of the beacon 1 has a radius "$R_A$" be "A", and let a circle connecting the second receiver 21b, a third receiver 21c, and the transmitting part 10 of the beacon 1 has a radius "$R_B$" be "B". Further, let the phase information received by the first receiver 21a from the transmitting part 10 of the beacon 1 be "$\theta_1$", let the phase information received by the second receiver 21b be "$\theta_2$", and let the phase information received by the third receiver 21c be "$\theta_3$". In this case, a central angle "$\theta_A$" between the first and second receivers 21a and 21b with respect to a center of the circle, "A", and a central angle "$\theta_B$" between the second and third receivers 21b and 21c with respect to a center of the circle "B" are calculated as follows.

$$\theta_A=2(\theta_2-\theta_1), \theta_B=2(\theta_3-\theta_2)$$

Thus, the central angles "$\theta_A$" and "$\theta_B$" are calculated based on the phase information "$\theta_1$", "$\theta_2$" and "$\theta_3$" received by the receiving part 20 of the mobile robot 60, and the intersection points of the two circles are thereby calculated to determine the position of the beacon 1 relative to the mobile robot 60. Therefore, the location of the mobile robot 60 relative to the beacon 1 can be inversely calculated.

If the phase information received through the receiving part 20 is more than three, the location of the mobile robot 60 can be more precisely calculated through an average value. In contrast, if the phase information received through the receiving part 20 is less than three, the location of the mobile robot 60 can be calculated by considering the phase information according to the displacement of the mobile robot 60. Besides the foregoing aspects, various methods using the phase information can be used to determine the location.

As described above, the present invention provides a robot system which can precisely determine a location of a mobile robot regardless of external environmental conditions, distance, and reduces cost by using few transmitters.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A robot system including a beacon with a transmitting part to transmit light to determine location, and a mobile robot with a receiving part to receive the light, the beacon comprising:

a rotation driving part to rotate the transmitting part; and an encoder to add phase information regarding rotation of the transmitting part to the light, and the mobile robot comprising:

a location determiner to determine a location of the mobile robot based on the phase information of the light received by the receiving part, wherein the rotation driving part outputs information on a phase shift of the transmitting part relative to a reference direction of the rotation driving part of the beacon in accordance with the rotation of the rotation driving part, and wherein the location determiner determines the location of the mobile robot based on a displacement of the mobile robot, and the phase information received by the receiving part.

2. The robot system according to claim 1, wherein the receiving part further comprising:

a conical mirror to reflect light from various directions towards one direction; and a receiver to receive the light reflected from the conical mirror.

3. The robot system according to claim 1, wherein the transmitting part further comprising:

a mirror disposed at an incline with respect to a horizontal direction; and a transmitter to emit the light at a predetermined incident angle;

wherein: the rotation driving part rotates the mirror, and the encoder adds the phase information regarding rotation of the mirror to the light.

4. The robot system according to claim 3, wherein the transmitting part further comprising:

two transmitters to emit light towards double sides of the mirror.

5. The robot system according to claim 1, wherein the receiving part further comprising:

at least one receiver to receive the light transmitted from the transmitting part.

6. The robot system according to claim 5, wherein the at least one receiver further comprises:

a conical mirror to concentrate light transmitted.

7. The robot system according to claim 1, wherein the beacon has inherent beacon information, and the encoder adds the beacon information and the phase information to the light.

8. The robot system according to claim 1, the beacon further comprising:

at least one mirror to reflect an incident light from the transmitting part at a predetermined angle.

9. The robot system according to claim 8, wherein the at least one mirror is a single sided mirror to reflect an incident light from the transmitting part at a predetermined angle.

10. The robot system according to claim 1, wherein the robot system further comprises:

a plurality of beacons.

11. The robot system according to claim 10, wherein each of the plurality of beacons have different inherent beacon information.

12. The robot system according to claim 10, wherein the beacons have beacon information and the encoder encodes or modulates the beacon information of the plurality of beacons with the phase information to the light.

13. A robot system including a beacon with a transmitting part to transmit light to determine location, and a mobile robot with a receiving part to receive the light, the beacon comprising:

a rotation driving part to rotate the transmitting part; and an encoder to add phase information regarding rotation of the transmitting part to the light, and the mobile robot comprising:

a location determiner to determine a location of the mobile robot based on the phase information of the light received by the receiving part, wherein the beacon further comprises:

at least one transmitter of the transmitting part provided to emit light towards respective sides of a double sided mirror at a predetermined angle; and at least one mirror is the double sided mirror to reflect incident light rays from the at least one transmitter at a predetermined angle.

14. A robot system including a beacon with a transmitting part to transmit light to determine location, and a mobile robot with a receiving part to receive the light, the beacon comprising:

a rotation driving part to rotate the transmitting part; and an encoder to add phase information regarding rotation of the transmitting part to the light, and the mobile robot comprising:

a location determiner to determine a location of the mobile robot based on the phase information of the light received by the receiving part, wherein the transmitting part further comprises: at least one transmitter spaced from another transmitter and rotated by the rotation driving part.

15. A robot system including a mobile robot, comprising:

a plurality of beacons;

at least one transmitter provided to at least one of the beacons to transmit light to determine location of the mobile robot;

at least one receiver provided to the mobile robot to receive the light transmitted via the at least one transmitter;

a rotation driving part to rotate the at least one transmitter an encoder to add phase information regarding rotation of the at least one transmitter with respect to a reference direction to the light; and a location determiner to determine a location of the mobile robot based on the phase information of the light received by the at least one receiver, wherein the rotation driving part outputs information on a phase shift of the transmitting part relative to a reference direction of the rotation driving part of the beacon in accordance with the rotation of the rotation driving part, and wherein the location determiner determines the location of the mobile robot based on a displacement of the mobile robot, and the phase information received by the at least one receiver.

16. The robot system according to claim 15, wherein each of the plurality of beacons have different inherent beacon information.

17. The robot system according to claim 16, wherein the mobile robot determines the source of received phase information, and calculates a location of the mobile robot.

18. A beacon to generate light to determine location of a mobile robot, comprising:

a transmitting part to transmit the light to determine the location;

a rotation driving part to rotate the transmitting part; and an encoder to add phase information regarding rotation of the transmitting part, wherein the rotation driving part outputs information on a phase shift of the transmitting part relative to a reference direction of the rotation driving part of the beacon in accordance with the rotation of the rotation driving part, and wherein the location of the mobile robot is determined based on a displacement of the mobile robot, and the phase information.

19. The beacon according to claim 18, wherein the transmitting part further comprises:

at least one transmitter rotated by the rotation driving part.

20. The beacon according to claim 18, wherein the transmitting part has inherent information, and the encoder adds the beacon information and the phase information to the light.

21. The beacon according to claim 18, wherein the transmitting part further comprises:

a mirror disposed at an incline with respect to a horizontal direction;

a transmitter to emit the light at a predetermined incident angle; wherein the rotation driving part rotates the mirror; and the encoder adds the phase information regarding rotation of the mirror to the light.

22. The beacon according to claim 21, wherein the mirror includes double sides and the transmitting part further comprises:

two transmitters to emit light towards the double sides of the mirror.

* * * * *

UNITED STATES PATENT AND TRADEMARK OFFICE
CERTIFICATE OF CORRECTION

PATENT NO. : 7,421,338 B2
APPLICATION NO. : 10/809351
DATED : September 2, 2008
INVENTOR(S) : Yong-jae Kim et al.

It is certified that error appears in the above-identified patent and that said Letters Patent is hereby corrected as shown below:

Column 9, Line 35, after "transmitter" insert --;--.

Signed and Sealed this

Ninth Day of December, 2008

JON W. DUDAS
*Director of the United States Patent and Trademark Office*